（12）United States Patent
Louis

(10) Patent No.: US 9,856,142 B2
(45) Date of Patent: Jan. 2, 2018

(54) HYDROGEN QUALITY DIFFERENTIATION AT REFUELING STATION

(71) Applicant: SHELL OIL COMPANY, Houston, TX (US)

(72) Inventor: Jurgen Johannes Jacobus Louis, Hamburg (DE)

(73) Assignee: SHELL OIL COMPANY, Houston, TX (US)

( * ) Notice: Subject to any disclaimer, the term of this patent is extended or adjusted under 35 U.S.C. 154(b) by 313 days.

(21) Appl. No.: 14/766,840

(22) PCT Filed: Feb. 7, 2014

(86) PCT No.: PCT/EP2014/052404
§ 371 (c)(1),
(2) Date: Aug. 10, 2015

(87) PCT Pub. No.: WO2014/124873
PCT Pub. Date: Aug. 21, 2014

(65) Prior Publication Data
US 2015/0368102 A1 Dec. 24, 2015

(30) Foreign Application Priority Data

Feb. 12, 2013 (EP) .................................. 13154936

(51) Int. Cl.
B65B 31/00 (2006.01)
C01B 3/58 (2006.01)
C01B 3/50 (2006.01)
F17C 5/06 (2006.01)

(52) U.S. Cl.
CPC ................. *C01B 3/58* (2013.01); *C01B 3/50* (2013.01); *F17C 5/06* (2013.01); *C01B 2203/0435* (2013.01); *F17C 2221/012* (2013.01); *F17C 2260/056* (2013.01); *F17C 2265/015* (2013.01);
(Continued)

(58) Field of Classification Search
CPC ..... C01B 3/58; C01B 3/50; C01B 2203/0435; F17C 5/06; F17C 2265/065; F17C 2260/056; F17C 2221/012; F17C 2265/015
See application file for complete search history.

(56) References Cited

U.S. PATENT DOCUMENTS

2005/0056661 A1  3/2005  Casamatta et al.
2006/0118575 A1  6/2006  Boyd et al.
(Continued)

FOREIGN PATENT DOCUMENTS

EP  1394105     3/2004
EP  1942300     7/2008
WO  2009057127  5/2009

OTHER PUBLICATIONS

Casamirra, M. et al; Safety studies of a hydrogen refueling station: determination of the occurrence frequency of the accidental scenarios; International Journal of Hydrogen Energy; vol. 34, No. 14; pp. 5846-5854; Jul. 1, 2009.

*Primary Examiner* — Jason K Niesz

(57) ABSTRACT

The present invention provides a process for dispensing gaseous hydrogen at a refueling station comprising before dispensing dividing an initial hydrogen stream into at least two streams, wherein at least one of the streams is purified in a hydrogen purification step. In a further aspect the invention provides a system for dispensing gaseous hydrogen.

15 Claims, 2 Drawing Sheets

(52) U.S. Cl.
CPC ....... *F17C 2265/065* (2013.01); *Y02E 60/321* (2013.01); *Y02E 60/324* (2013.01)

(56) References Cited

U.S. PATENT DOCUMENTS

2006/0236608 A1 10/2006 Khan et al.
2007/0042241 A1 2/2007 Matsuo et al.

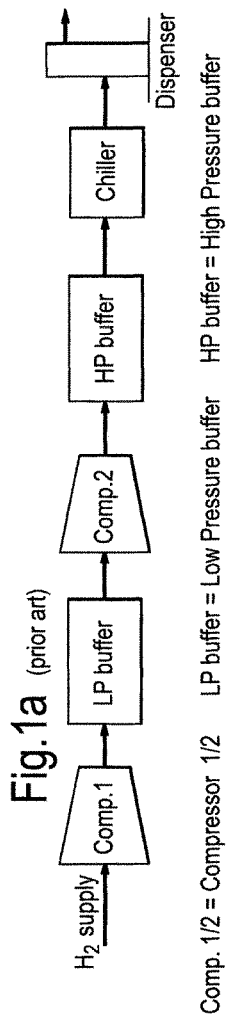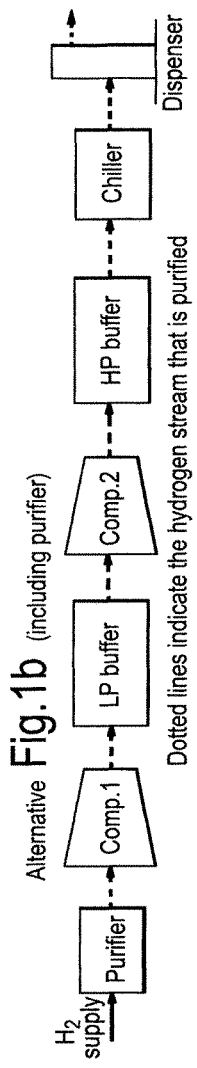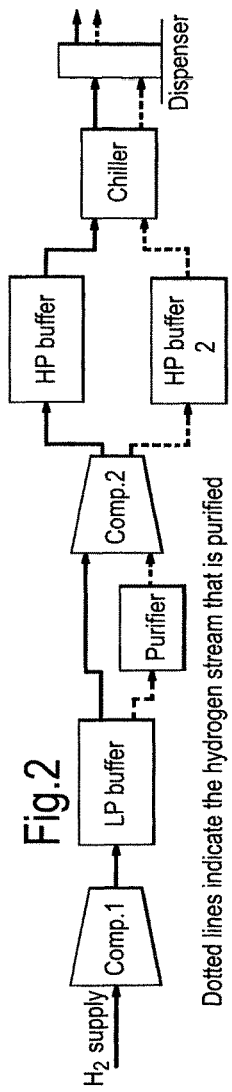

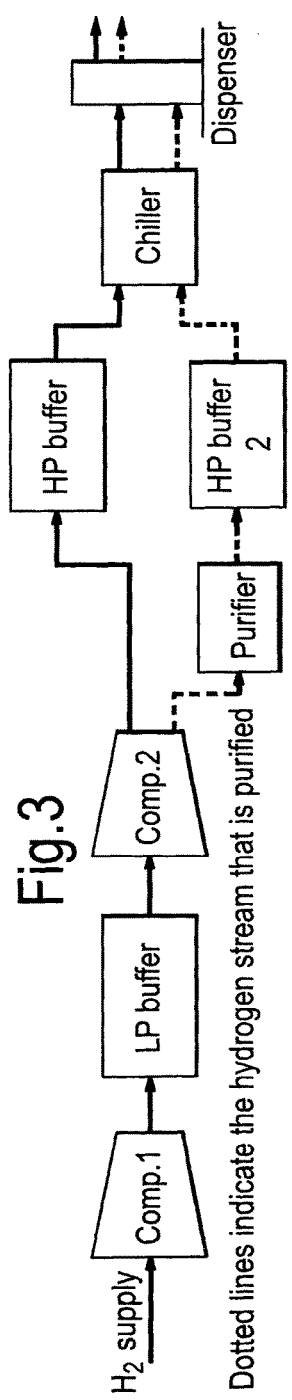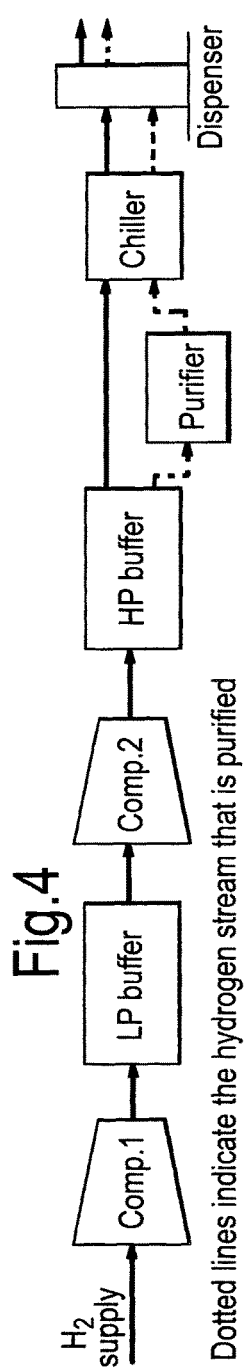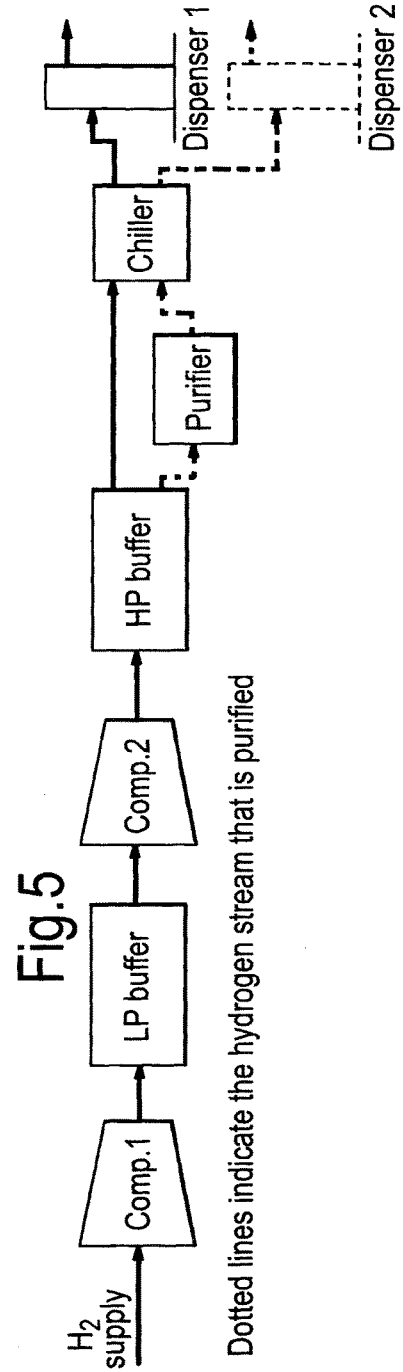

HYDROGEN QUALITY DIFFERENTIATION AT REFUELING STATION

PRIORITY CLAIM

The present application is the National Stage (§371) of International Application No. PCT/EP2014/052404, filed Feb. 7, 2014, which claims priority from European Application No. 13154936.2, filed Feb. 12, 2013 incorporated herein by reference.

FIELD OF THE INVENTION

This invention relates to a process and system for dispensing hydrogen of more than one quality.

BACKGROUND OF THE INVENTION

In recent years, there has been a great deal of interest in the development of alternative energy sources, or energy carriers, such as hydrogen. Automobiles and other vehicles that use hydrogen as a fuel source have been developed, and methods for refueling these vehicles that can compete with gasoline fuelling stations on scale and/or cost have been designed and are being further developed.

Nowadays, there is a range of possible supply chains for hydrogen to refueling stations, including delivery routes (e.g. truck or pipeline) and forecourt production routes (e.g. hydrocarbon reforming or water electrolysis). Hydrogen of a purity high enough for fuel cell cars and up to the relevant standards is delivered (in gaseous form, commonly) to one or more storage tanks at the station, then compressed and stored in high pressure buffer tanks. It is then cooled and dispensed. A single dispenser may have more than one hose, providing hydrogen of different purities or at a different pressure. Depending on the source of the hydrogen, an initial purification step at the refueling station may be necessary in order to produce a hydrogen stream of sufficient purity for use in fuel cell cars.

Cars powered by proton exchange membrane (PEM) fuel cells depend on a supply of pure hydrogen. While some impurities (e.g. inert gases) are an issue in that their presence simply reduces the proportion of hydrogen present in the fuel and thus the efficiency of the car, other impurities have more serious consequences for the lifetime of the fuel cell. Cumulative and irreversible efficiency reduction through 'poisoning' of the catalyst (adsorption on to its surface, reducing the number of active sites), for example, is caused by even very small (ppm) amounts of sulphur.

Standards are under development which will specify hydrogen purity requirements at the refueling station. SAE J 2719, an international Standard which provides background information and a hydrogen fuel quality standard for commercial proton exchange membrane (PEM) fuel cell vehicles ('Hydrogen fuel quality for fuel cell vehicles), serves as a starting point for ISO14687 ('Hydrogen Fuel Product Specification for PEMFC Applications for Road Vehicles'), currently under development, as shown in the Table below. The specification from a commercial hydrogen provider (Linde) is also given for information. While the purity levels in the proposed standard are commensurate with an acceptable lifetime for fuel cells, clearly lower levels of impurities would be even more advantageous.

| Contaminant upper limits in ppm unless specified otherwise | SAE J 2719 | ISO DIS 14687-2 | Linde 5.0 | Limit of detection |
|---|---|---|---|---|
| Hydrogen fuel index | 99.99% | 99.97% | 100.00% | — |
| Total allowable non-$H_2$, non-He | 100 | 300 | — | — |
| Water | — | — | — | — |
| Liquid water | 5 | 5 | 5 | 1 |
| Water vapour | | | | |
| Total hydrocarbons (C1 basis) | 2 | 2 | 0.5 | 0.05 |
| Oxygen | 5 | 5 | 2 | 0.1 |
| Inerts | | | | |
| Helium | TBD | 300 | — | 10 |
| Nitrogen | TBD | 100 | 3 | 0.1 |
| Argon | | | — | |
| Carbon Dioxide | 1 | 1 | — | 0.1 |
| Carbon Monoxide | 0.2 | 0.2 | — | 0.1 |
| Total sulphur compounds | 0.004 | 0.004 | — | 0.1 |
| H2S | — | — | — | 0.005 |
| Formaldehyde | 0.01 | 0.01 | — | 0.06 |
| Formic Acid | 0.2 | 0.2 | — | 0.2 |
| Ammonia | 0.1 | 0.1 | — | 0.1 |
| Total halogenated compounds | 0.05 | 0.05 | — | 0.005-0.05 |
| Particulate (max. size) | 10 μm | — | — | 0.1 |
| Particulate concentration | 1 μg/l | 1 mg/kg | — | 0.005 mg/kg; 1 μg/l |

Furthermore, it may be financially advantageous to reduce impurity levels. Calculations indicate that improving the CO levels in fuel from the ISO14687 proposed minimum of 0.2 ppm to 0.1 ppm, for example, may reduce the lifetime fuel cost by over 1%. This does not include potential reduced capital and maintenance costs which could also be exploited when purer hydrogen is used, resulting from use of lower catalyst loadings and higher current densities, combined with less frequent maintenance.

SUMMARY OF THE INVENTION

A new process has now been found that provides the possibility to clean a part of the hydrogen supplied at the refueling station by a purification process integrated into the system between delivery of hydrogen to the station and dispensation to customer vehicles.

Accordingly, the present invention provides a process for dispensing gaseous hydrogen at a refueling station comprising before dispensing dividing an initial hydrogen stream (delivered at a purity level meeting the relevant standard, e.g. for use in PEM fuel cells) into at least two streams, wherein at least one, but not all, of the streams is purified in a hydrogen purification step or steps.

The process of the invention allows sale of hydrogen of two qualities, a main grade and a premium grade with higher purity. In an embodiment of this process, all of the supplied hydrogen can be purified to obtain the hightest quality hydrogen.

A further embodiment of the invention relates to a system for performing the process of the invention. This is a system for dispensing gaseous hydrogen comprising in a subsequent line-up a combination of the following: a low pressure buffer tank (LPB), a compressor (Comp.), a high pressure buffer tank (HPB), a chiller (Ch.) and at least one final dispenser (disp.), wherein at least one of LPB, Comp. and HPB has two exits, one for separating a part of the hydrogen stream, the other for the remaining part of the hydrogen stream, and wherein the system further comprises a purifier, the inlet of the purifier being located in line after one exit of one of LPB, Comp. and HPB.

BRIEF DESCRIPTION OF THE DRAWINGS

FIG. 1a shows a simplified schematic diagram of the hydrogen flow at a refueling station according to the prior art. Hydrogen of industrial purity flows from the input, possibly via a purifier (see FIG. 1b), (potentially via a compressor, Comp.1) to a low pressure buffer tank (200-350 bar), via a compressor (Comp.2) to a high pressure tank (up to 700 bar) and then through a chiller to the final dispenser. Details of mass flows and options such as multiple dispensers and storage tanks are omitted for the sake of simplicity.

FIG. 2 provides a schematic representation of a system according to the invention illustrating purification after the low pressure buffer tank.

FIG. 3 provides a schematic representation of a system according to the invention illustrating purification after the compression step.

FIG. 4 provides a schematic representation of a system according to the invention illustrating purification between high pressure buffer and dispenser.

FIG. 5 provides a schematic representation of a system according to the invention illustrating dispensing of high-purity hydrogen from a dedicated unit (the location of the purifier is not specific, may also be at different positions).

DETAILED DESCRIPTION OF THE INVENTION

The invention described herein provides a process for dispensing gaseous hydrogen in different qualities.

In a further embodiment of the invention, the process further comprising passing the initial stream of hydrogen from a supply (potentially via a compressor), into a low pressure buffer tank (200-350 bar), subsequently passing the stream via a compressor into a low pressure buffer tank (up to 700 bar), followed by passing the strea, via a chiller to a final dispenser, wherein the process further comprises a step in which a part of the hydrogen stream is separated and passed through a purifier which is located in line after the low pressure tank.

In a further embodiment of the invention, the process further comprising passing the initial stream of hydrogen from a supply (potentially via a compressor), into a low pressure buffer tank (200-350 bar), subsequently passing the stream via a compressor into a high pressure buffer tank (up to 700 bar), followed by passing the stream via a chiller to a final dispenser, wherein the process further comprises a step in which a part of the hydrogen stream is separated and passed through a purifier which is located in line after the low pressure tank.

In another embodiment of the invention, the part of the hydrogen that is separated in the process, is passed through a purifier before it is compressed, preferably using the same compressor as is used for compressing the remaining part of the hydrogen.

Preferably, a fraction of the initial hydrogen stream (delivered at a purity level meeting the relevant standard) of below 50%, in an embodiment of below 25% and in another embodiment of below 10% is taken from the bulk (low pressure) storage and purified further. The pure stream is then compressed, preferably using the same compressor as the rest of the hydrogen (but at a different time) and stored in a separate high pressure buffer storage (FIG. 2). Preferably, the (second) compressor is designed appropriately and run in such a way that it runs on a schedule which maintains both buffer tanks full for as much of the time as possible, to make the best use of the equipment. From the high pressure storage the purified hydrogen stream passes through the same cooler and can be dispensed by the same dispenser as the main grade (remaining hydrogen stream); the customer can select the quality at the dispenser.

Preferably, the purification is carried out as close as possible to the dispensing point, i.e. after the (second) compression step. Thus, a further embodiment relates to a process, wherein the stream of hydrogen is first passed through the compressor and thereafter a part is separated for passing through a purifier. Preferably, the separated part of hydrogen is subsequently led into a second high pressure buffer tank followed by passing it into the same chiller as is used for chilling the remaining part of the hydrogen (FIG. 3). In this process, it is highly preferred that chilling of the separated part of the hydrogen takes place at a different time than that of the remaining part of the hydrogen. Otherwise, the streams get mixed and only one grade of hydrogen can be dispensed. Preferably, the system runs on a schedule which maintains all buffer tanks full for as much of the time as possible.

Still closer to the dispensing point, the hydrogen stream may be separated and purified at an even later stage. Thus, in another embodiment, the stream of hydrogen is first passed through both the compressor and the high pressure buffer tank and thereafter a part is separated for passing it through a purifier (FIG. 4).

In this process, it is highly preferred that chilling of the separated part of the hydrogen takes place at a different time than that of the remaining part of the hydrogen. Otherwise, the streams are mixed and only one grade of hydrogen can be dispensed. Preferably, the system runs on a schedule which maintains all buffer tanks full for as much of the time as possible.

In another embodiment of the invention, a separate dispenser is used for the purified hydrogen (see FIG. 5).

Purification of hydrogen according to the invention takes place using techniques known in the art, and preferably, wherein the purification comprises use of a membrane or a palladium catalyst.

That which is claimed is:

1. A process for dispensing gaseous hydrogen at a refueling station comprising before dispensing dividing an initial hydrogen stream into at least two streams, wherein at least one, but not all, of the streams is purified in a hydrogen purification step or steps.

2. The process according to claim 1, further comprising passing the initial stream of hydrogen from a supply into a low pressure buffer tank, subsequently passing the stream via a compressor into a high pressure buffer tank, followed by passing the stream via a chiller to a final dispenser, wherein the process further comprises a step in which a part of the hydrogen stream is separated and passed through a purifier which is located in line after the low pressure tank.

3. The process according to claim 2, wherein the part of the hydrogen that is separated is passed through a purifier before it is compressed.

4. The process according to claim 3, wherein the hydrogen is compressed using the same compressor as for compressing the remaining part of the hydrogen.

5. The process according to claim 4, wherein compression of the separated part of the hydrogen takes place at a different time than that of the remaining part of the hydrogen.

6. The process according to claim 4, wherein the system runs on a schedule which maintains the buffer tanks full for as much of the time as possible.

7. The process according to claim 2, wherein the stream of hydrogen is first passed through the compressor and thereafter a part is separated for passing through a purifier.

8. The process according to claim 7, wherein the separated part of hydrogen is subsequently led into a second high pressure buffer tank followed by passing it into the same chiller as is used for chilling the remaining part of the hydrogen.

9. The process according to claim 8, wherein chilling of the separated part of the hydrogen takes place at a different time than that of the remaining part of the hydrogen.

10. The process according to claim 8, wherein the system runs on a schedule which maintains the buffer tanks full for as much of the time as possible.

11. The process according to claim 2, wherein the stream of hydrogen is first passed through both the compressor and the high pressure buffer tank and thereafter a part is separated for passing it through a purifier.

12. The process of claim 11, wherein the purification is followed by passing the separated part into the same chiller as is used for chilling the remaining part of the hydrogen.

13. The process of claim 1, wherein the purification comprises using a membrane or a palladium catalyst.

14. The process of claim 1, wherein a separate dispenser is used for the purified hydrogen.

15. A system for dispensing gaseous hydrogen comprising in a subsequent line-up a combination of the following: a low pressure buffer tank, a compressor, a high pressure buffer tank, a chiller and at least one dispenser, wherein at least one of the low pressure buffer tank, compressor, and high pressure buffer tank has two exits, one for separating a part of a hydrogen stream, the other for the remaining part of the hydrogen stream, and wherein the system further comprises a purifier, the inlet of the purifier being located in line after one exit of one of the low pressure buffer tank, compressor, and high pressure buffer tank for the separated part of the hydrogen stream.

\* \* \* \* \*